US009165443B2

(12) United States Patent
Bachels et al.

(10) Patent No.: US 9,165,443 B2
(45) Date of Patent: Oct. 20, 2015

(54) DETECTOR

(75) Inventors: Thomas Bachels, Benzenschwil (CH); Simon Daniel Fischer, Dietwil (CH)

(73) Assignee: Vanderbilt International GmbH, Wiesbaden-Nordenstadt (DE)

( * ) Notice: Subject to any disclaimer, the term of this patent is extended or adjusted under 35 U.S.C. 154(b) by 270 days.

(21) Appl. No.: 13/290,568

(22) Filed: Nov. 7, 2011

(65) Prior Publication Data

US 2012/0112073 A1 May 10, 2012

(30) Foreign Application Priority Data

Nov. 5, 2010 (EP) .................................... 10190290

(51) Int. Cl.
*G01J 5/08* (2006.01)
*G08B 13/193* (2006.01)

(52) U.S. Cl.
CPC .................................... *G08B 13/193* (2013.01)

(58) Field of Classification Search
CPC ............ G08B 13/193; B01J 5/08; B01J 1/00; B01J 1/04; G01V 8/12; G01V 8/14; G01V 8/22
USPC ....................... 250/353, 216, 221, 222.1, 239
See application file for complete search history.

(56) References Cited

U.S. PATENT DOCUMENTS

| | | | | |
|---|---|---|---|---|
| 4,707,604 | A | 11/1987 | Guscott | |
| 4,709,152 | A | 11/1987 | Mueller et al. | |
| 4,990,783 | A * | 2/1991 | Muller et al. | 250/353 |
| 5,923,250 | A * | 7/1999 | Pildner et al. | 340/567 |

FOREIGN PATENT DOCUMENTS

| | | | |
|---|---|---|---|
| DE | 3812969 | A1 | 11/1989 |
| EP | 0191155 | A1 | 8/1986 |
| EP | 0537024 | A1 | 4/1993 |

* cited by examiner

*Primary Examiner* — David Porta
*Assistant Examiner* — Djura Malevic
(74) *Attorney, Agent, or Firm* — Laurence A. Greenberg; Werner H. Stemer; Ralph E. Locher

(57) ABSTRACT

A detector includes a housing with at least one window for allowing radiation to enter, at least one sensor for sensing entered radiation, a unit for processing sensor signals, and mirrors that are shaped and mounted in the housing for reflecting radiation from outside detection zones better than radiation from elsewhere, onto the sensor. Linked mirrors reflect radiation from a detection zone consecutively and each mirror in at least one linked pair is shaped and mounted in the housing so as to prevent it from reflecting radiation from another detection zone in sequence with other mirrors onto the sensor, thus optically isolating the pair from other mirrors.

8 Claims, 3 Drawing Sheets

DETECTOR

CROSS-REFERENCE TO RELATED APPLICATION

This application claims the priority, under 35 U.S.C. §119, of European Patent Application EP 10 190 290, filed Nov. 5, 2010; the prior application is herewith incorporated by reference in its entirety.

BACKGROUND OF THE INVENTION

Field of the Invention

The invention relates to a detector that includes a housing with at least one window for allowing radiation to enter, at least one sensor for sensing entered radiation, a unit for processing sensor signals, and mirrors that are shaped and mounted in the housing for reflecting radiation from outside detection zones better than radiation from elsewhere onto the sensor, wherein linked mirrors reflect radiation from a detection zone consecutively and at least two mirrors are themselves linked to a common mirror.

Depending to an extent on their application, it is important that such detectors monitor a large area with a high number of detection zones with high and highly uniform sensitivity for each zone, yet be moderate in size, especially for indoor use.

The use of several mirrors allows for creating more detection zones than the number of sensors would otherwise create. They can, for instance, be produced economically by injection-molding substrates and selectively coating several mirrors on each one. Since they may be connected seamlessly, one might ask what counts as separate mirrors. Flat mirrors are separate if their planes intersect or run parallel but at a distance. For concave mirrors, an area that includes a single vertex counts as one. There are unquestionably two distinct mirrors if the extensions of two such nearby areas by polynomial extrapolation run parallel at a distance of more than 0.3 mm or intersect at an angle of more than 1°.

Mirrors are usually shaped as sections of a near-perfect circular paraboloid, or flat in the extreme, thus limiting optical aberration and creating a sharp focal point. To an extent, deviation from a circular paraboloid can be helpful for adjusting focal length, as long as the consequence of optical aberration on yield and frequency shift remains acceptable.

The detector housing can be made more compact by linking mirrors, which means that radiation from a detection zone is first reflected by a primary mirror, then by a secondary mirror and possibly even by further mirrors before it reaches the sensor. In that way, the large focal lengths required for distant detection zones can be cut in part. Care must be taken however not to lose much of the radiation that falls outside the mirror area with each reflection, at the expense of the resulting sensor signal amplitude. A large amplitude is desirable to separate noise and disturbing signals from wanted signal, provided that noise and disturbing signals do not scale with the size of the optics, in particular to assure electromagnetic compatibility and to suppress microphonic effects.

Furthermore, the detector should not just generate large signal amplitudes but be similarly sensitive for radiation from the various detection zones. For several reasons, homogeneous signals are beneficial for the signal analysis by the dedicated detector unit.

In a presence detector or in a heat detector for example, a uniform amplitude sensitivity over all zones implies that alerting only depends on the radiation source, not on its position within the detection area. If that were otherwise, an alarm level should be matched to the weakest zone, and immunity to false alarms be reduced in the other zones.

In a motion detector, another kind of detector sensitivity should additionally be sufficiently similar for all detection zones, namely the so-called signal frequency. In that field, a skilled person understands the word frequency to reflect the main frequency component of the sensor signals that arise when an object moves through detection zones. The frequency may be calculated, for instance, on the basis of the delay between the single positive and negative peaks that arise when the processing unit adds the signal strengths of two reversely polarized pyroelectric sensors that observe a detection zone while a radiating object moves therethrough. The frequency may even be calculated from a single signal peak by using Fourier-analysis. Depending on detector construction and method of calculation, the frequency is a more or less accurate measure for the velocity of movement. A uniform frequency sensitivity allows for distinguishing known disturbing signals from wanted signals, and the alerting velocity band becomes uniform for all zones.

As a direct consequence of those considerations, a large focal length is required for the far detection zones. In contrast, the near zones should have quite a small focal length. A horizontal mirror row in an operatively oriented detector typically corresponds to a single arc of three-dimensional detection zones at floor level. The sidewise zones thereof are often shortened in their detection range as compared to the central zones, in order to fit the geometry of a square detection area. Consequently, the sidewise zones should have a smaller focal length compared to the central zones of the same horizontal mirror row. Using a standard mirror optics, that inevitably causes shadowing effects for the other zones.

In spite of the foregoing, many known motion detectors with mirror optics or Fresnel optics are constructed with a reduced focal length for their far zones in order to reduce the thickness of the detector. As a consequence, with everything else remaining equal, the frequency of the signals in the far zones will be smaller than in other zones, resulting in an undesired shift of the alerting velocity band to higher velocities, or a reduction of the immunity against disturbance sources of low frequency, such as air turbulence. Often, a low focal length is compensated by an increased area at the expense of other zones, which causes the motion detectors to be oversensitive for high object velocities.

German Published Patent Application DE 38 12 969 A1 and European Published Patent Application EP 537 024 A1 describe infrared detectors with adjoining Fresnel-lenses for each projecting radiation from an outside detection zone onto the sensor. Some Fresnel-lenses forward that radiation to mirrors first, in the former document to a uniquely linked mirror pair and in the latter to a single mirror that is common to them. The latter document also shows a dedicated mirror pair that is not linked with a Fresnel-lens. Neither document, however, describes linking two mirrors to a common mirror. Instead of filling up the housing interior with mirrors, they teach relying on Fresnel lenses for dividing up detection zones. By comparison, compactness of and shadowing by the mirror configuration hardly matter. Such detectors, however, are less sensitive and lack focal length flexibility for locating detection zones. Obtaining uniform signal amplitude requires completely different considerations.

U.S. Pat. No. 4,707,604 describes a ceiling-mountable infrared intrusion detector. The outside detection zones are distributed all around it. In addition to secondary mirrors that are each linked to several primary mirrors, it contains a truncated-cone-shaped primary mirror mounted around the sensor that uniquely projects radiation onto a concave, circular secondary mirror mounted directly below. Therefore, those two mirrors constitute a dedicated pair of mirrors. The primary mirror is heavily curved into a tapered ring, thereby causing radiation to form "smeared" energy patterns on the sensor. Another embodiment avoids the smearing problem by dispensing with the dedicated pair. Either way, U.S. Pat. No. 4,707,604 teaches away from an optimization of detector compactness, sensitivity, uniformity and flexibility.

In European Published Patent Application EP 0 191 155 A1, corresponding to U.S. Pat. No. 4,709,152, a folded mirror optics of a passive infrared motion detector with primary mirrors and secondary mirrors is described. The incoming radiation of each zone is subject to two reflections, with the exception of the lookdown zone, for which one reflection suffices. Along those optical paths, the radiation is imaged to sensor elements. The primary mirrors are disposed in three horizontal rows for the far zones, the middle zones and the near zones, respectively, wherein each mirror corresponds to a detection zone with a different azimuthal direction angle. For each row, a single continuous surface of one secondary mirror reflects incoming radiation from all primary mirrors to the sensor elements. Two secondary mirrors are plane, the third is concave. The size of each common secondary mirror ensures that most, if not all, radiation from a detection zone that reflects from any single primary mirror is captured by it.

Using concave primary mirrors for the far zones allows for a focal length that is about twice as large as the depth of the detector. The small focal lengths of the near zones have been realized with plane primary mirrors and the concave secondary mirror.

However, such a structure is not without drawbacks. A collective plane secondary mirror precludes adjusting the focal lengths of the sidewise zones, because the corresponding primary mirrors are concave, which makes for long focal paths from the primary mirrors to the secondary mirror and then onwards to the sensor. In order to shorten at least the first part thereof, such primary mirrors are placed close to the secondary mirror. Their prominent position, however, prevents some incoming radiation from reaching the other, more receded primary mirrors. That shadowing effect causes the receded primary mirrors or their effective area to be smaller than they otherwise would be. Furthermore, the freedom of orientation concerning the primary mirrors for the sidewise zones is reduced as they are closer to the secondary mirror, in the sense that the latter should not block their view. Such forced orientation considerably restricts the extent of choice in placing their detection zones.

Also, in an operatively oriented detector, a system of plane primary mirrors in a horizontal row and a collective paraboloid secondary mirror focuses the radiation of the different detection zones to the centric sensor only if the plane primary mirrors deflect the incoming radiation in a direction parallel to the symmetry axis of the secondary mirror. That means that the surface normal of each plane primary mirror must be parallel to the bisecting line between the symmetry axis of the concave secondary mirror and the direction of the relevant detection zone. As a consequence, the position of the primary mirror alone determines the position of the optically active area of the secondary mirror. Furthermore, the system creates one single focal length, independent of the position the plane primary mirrors, whereas the required focal length typically does vary with its position in order to place the detection zones where they are needed most. Where no detection zone is required at the distance corresponding to the single focal length, the horizontal row of primary mirrors will show a gap. For example, if the sensor is meant to observe two nearby sidewise zones and to ignore the equidistant central region, then there are no central primary mirrors and no radiation is projected on the centric area of the collective concave secondary mirror. That limitation in the degrees of freedom can significantly limit the energy yield of the mirror optics.

Finally, the alternative of a common secondary mirror that is concave but not a perfect circular paraboloid would allow for more degrees of freedom but at the expense of introducing optical aberration.

SUMMARY OF THE INVENTION

It is accordingly an object of the invention to provide a detector, which overcomes the hereinafore-mentioned disadvantages of the heretofore-known detectors of this general type, which is compact and which monitors well-positioned detection zones over a large area with high sensitivity that is also uniform for the various zones.

With the foregoing and other objects in view there is provided, in accordance with the invention, a detector, comprising a housing with at least one window for allowing radiation to enter, at least one sensor for sensing entered radiation, a unit for processing sensor signals and mirrors being shaped and mounted in the housing for reflecting radiation from outside detection zones better than radiation from elsewhere, onto the at least one sensor. Linked mirrors reflect radiation from a detection zone consecutively and at least two mirrors are themselves linked to a common mirror. Each of the mirrors in at least one linked pair is shaped and mounted in the housing so as to prevent it from reflecting radiation from another detection zone in sequence with other mirrors onto the at least one sensor and one of the mirrors in the linked pair is concave and the other mirror is substantially flat.

In this way, at least one pair of linked mirrors is dedicated to transporting radiation from a single detection zone to the sensor, without contributing to such transport of radiation from other zones, even if the net result is a reduction of the available mirror area for all concerned detection zones. For detection zones where it matters, the reduction of shadowing effects and the increased freedom in spatially arranging mirrors in the housing turns out to outweigh this loss.

Any spatial configuration of mirrors in an optical system will favor some detection zone positions over others. In particular, primary mirrors in a horizontal row easily project detection zones on a semicircle at floor level around the detector, but major variations of the zone distance or of angular distribution cause problems. According to the invention, the dedicated mirror pairs are especially well allocated to zones that are comparatively distant or, even better, comparatively close. In other words, the dedicated mirror pairs preferably bring about respective long focal lengths and short focal lengths. For this purpose, one mirror in the linked pair is concave and the other mirror is substantially flat.

However, not all mirrors are linked in pairs that are dedicated to transporting radiation from their own detection zone only. Instead, they are best mixed with mirrors that are each linked to several other mirrors. Apparently, at some point the reduction of shadowing effects and the improvement of their spatial configuration no more outweighs the loss of available mirror area for each detection zone.

In contrast to known detectors with the folded mirror optics, the invention surprisingly allows for detectors which are less than 3 centimeters thick that more homogeneously and with improved uniformity of sensitivity cover detection zones from the floor immediately below up to 12 meters away. It is expected that 3 centimeters thick detectors according to the invention will display such performance, yet reach all the way up to 18 meters or more.

Advantageously, this dedicated mirror pair also operates independently of any second path along which radiation from the pair's own detection zone might be transported to the sensor in parallel.

In accordance with another preferred feature of the invention, therefore, each mirror in the linked pair is shaped and mounted in the housing so as to prevent it from reflecting radiation from their detection zone in sequence with other mirrors onto the sensor.

In accordance with a further feature of the invention, preferably, the first mirror in the linked pair, in sequence from their detection zone, is substantially flat and the second mirror is concave.

In accordance with an added preferred feature of the invention, a mirror in the linked pair is lined up horizontally in operative orientation with at least two mirrors that are themselves linked to a common mirror.

In accordance with an additional feature of the invention, preferably, a mirror in the linked pair is lined up horizontally in operative orientation with at least three mirrors that are themselves linked to one or more common mirrors.

In accordance with yet another feature of the invention, likewise, mirrors constitute horizontal rows in operative orientation, in which rows the smaller vertical extension of neighboring mirrors overlaps the larger by more than 50%, and at least two rows each contain two or more mirrors that are each linked to one and only one mirror in the other row.

In accordance with yet a further preferred feature of the invention, preferably, the linked mirrors in one row are substantially flat and those in the other row are concave.

The invention is best embodied as a motion detector. Besides requiring uniform amplitude sensitivity over their detection zones, motion detectors require very uniform frequency sensitivity.

In accordance with yet an added feature of the invention, therefore, preferably, the unit is suitable for generating a signal representative of the movement of an object through the detection zones.

There is no principle restriction as to the kind of radiation. The detector might, for example, be a matrix radar that includes a microwave sender for illuminating floor zones by reflection on metallic mirrors and a microwave receiver for sensing returning radiation.

In accordance with a concomitant feature of the invention, given the sensitivity, reliability, availability and low costs of infrared sensors, however, the window, sensor and mirrors are capable of acting as such for infrared electromagnetic radiation.

Other features which are considered as characteristic for the invention are set forth in the appended claims.

Although the invention is illustrated and described herein as embodied in a detector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
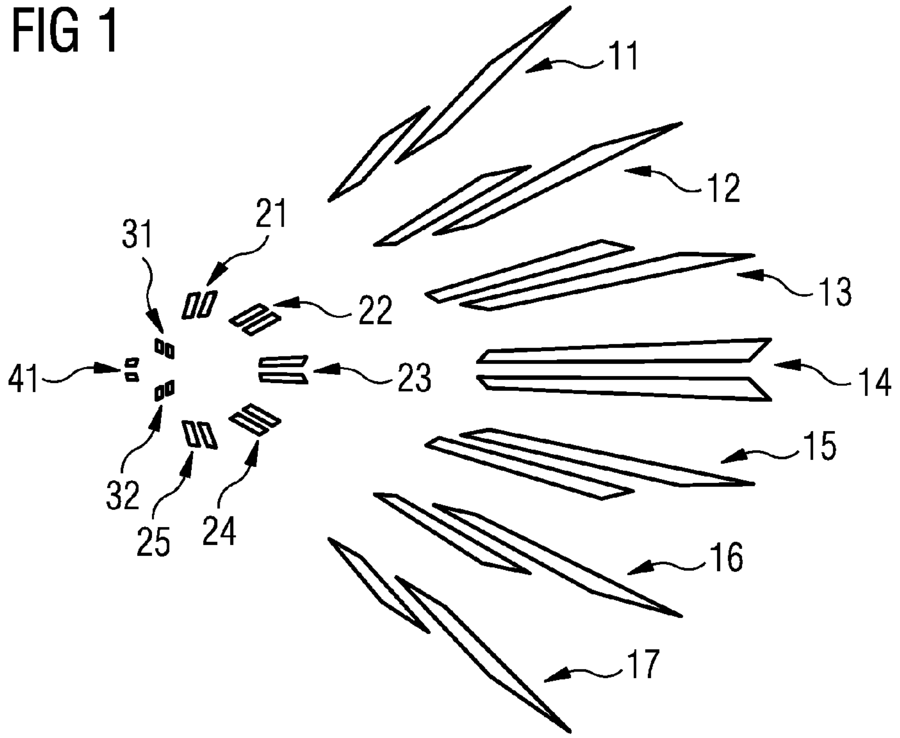
FIG. 1 is an illustration of a horizontal detection zone pattern of a passive infrared motion detector according to the invention.

Referring now to the figures of the drawings in detail and first, particularly, to FIG. 1 thereof, there are seen zones 11, 12, 13, 14, 15, 16, 17, 21, 22, 23, 24, 25, 31, 32, 41 of a detection area of a detector, in which two sensor elements of the detector are mapped as two elongated squares in each zone. If a person moves through an elongated square, his or her heat radiation is transported to a sensor element.

Figure 2:
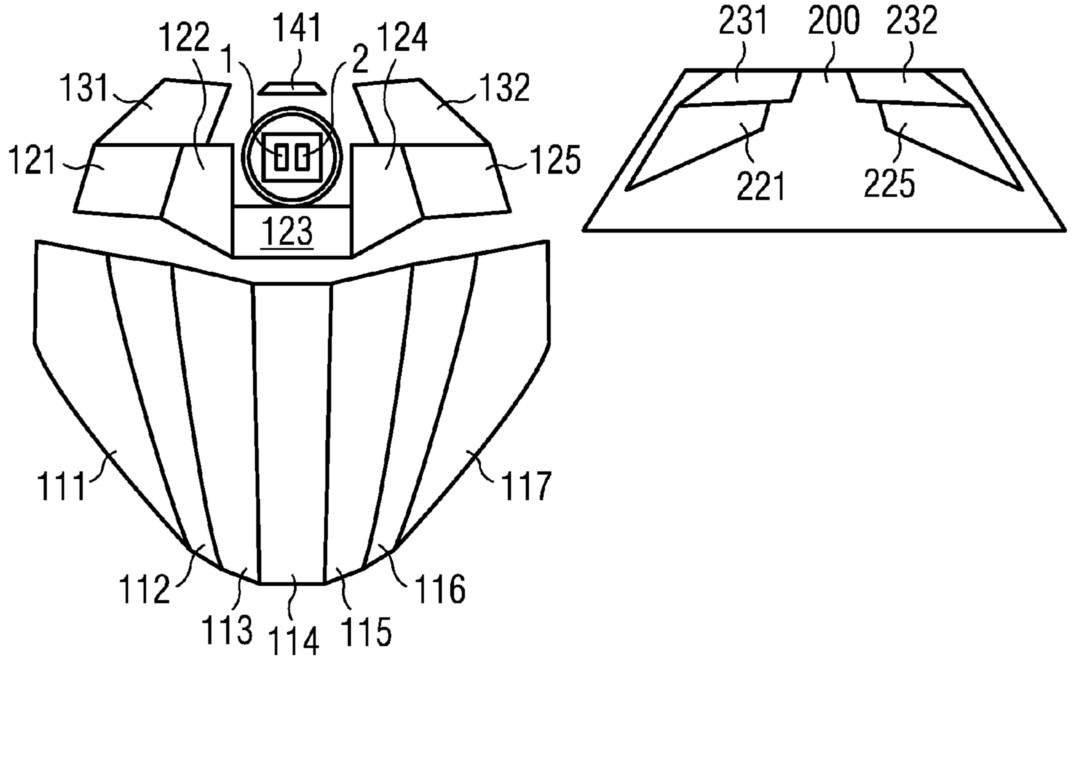
FIG. 2 is a diagrammatic, front-elevational view of a sensor and mirrors as they are mounted within a housing of a detector in operative orientation in which, however, all secondary mirrors have been reversed by 180° around a vertical axis and moved sideward so as to expose underlying sensor elements and mirrors.

FIG. 2 shows two sensor elements 1, 2 which are pyroelectric sensors. Infrared radiation from most detection zones is reflected firstly by primary mirrors 111, 112, 113, 114, 115, 116, 117, 121, 122, 123, 124, 125, 131, 132 and then by secondary mirrors 200, 221, 225, 231, 232 onto the sensor elements 1, 2. In this sense, each of these primary mirrors is linked to one or more secondary mirrors.

Figure 3:
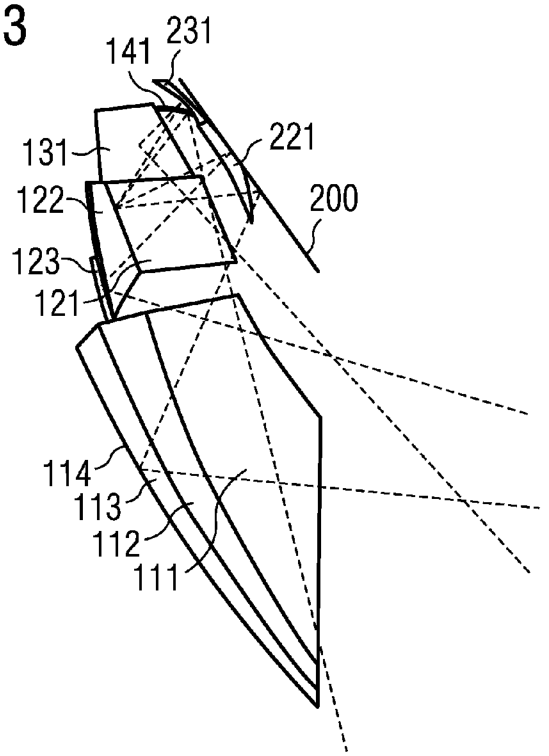
FIG. 3 is a side-elevational view of the mirrors.
Figure 4:
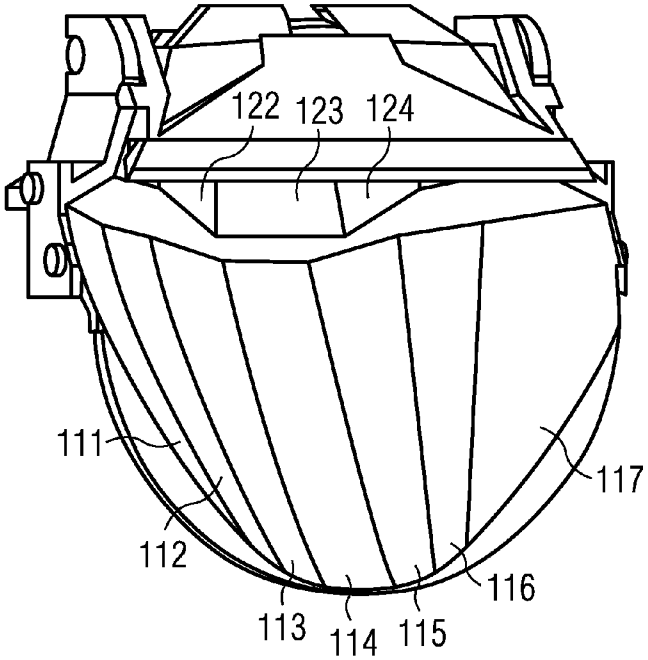
FIG. 4 is a perspective view of the mirrors.

FIG. 3 uses dotted lines to show how some of these mirrors 114, 123, 131, 141, 200, 231 reflect radiation from four detection zones at various distances. Although not shown, the sensor elements are located where the dotted lines converge.

The nearest, so-called lookdown zone 41 is located almost below the detector. A primary mirror 141, without being linked to any secondary mirror, reflects the radiation from there directly on the sensor elements 1, 2.

Beyond the lookdown zone 41, nearby detection zones 31, 32 are monitored by plane primary mirrors 131, 132, which are each linked uniquely to a dedicated concave secondary mirror 231, 232. The short distance between the sensor elements 1, 2 and the concave secondary mirrors 231, 232 allows for required short focal lengths.

Likewise, the short focal length for the sidewise detection zones 21, 25 is obtained by adjoining concave secondary mirrors 221, 225 on either side of a collective plane secondary mirror 200, which is meant to reflect radiation from central detection zones 22, 23, 24.

The primary mirror 121 reflects radiation from one of the sideway zones 21 onto the secondary mirror 221, which in turn reflects the radiation onto the sensor elements 1, 2. Both the primary mirror 121 and the secondary mirror 221 are shaped and mounted in the detector housing so as to prevent it from reflecting radiation from another detection zone in sequence with other mirrors onto the sensor elements. Likewise, the primary mirror 125 and the secondary mirror 225 are dedicated only to the sideway detection zone 25 at the other end. For one thing, because respective dedicated mirror pairs 121, 221 and 125, 225 are optically isolated from mirrors nearby, the order in which nearby concave and flat mirrors transport radiation to the sensor elements 1, 2 can be reversed. Thus, concave primary mirrors 122, 123, 124 in the middle can reflect radiation from more distant central detection zones 22, 23, 24 onto the common plane secondary mirror 200 and onto the sensor elements 1, 2 with long focal lengths. Furthermore, the optical isolation of the mirrors 121, 125, 221, 225 from all other mirrors provides additional freedom of location, size and orientation, which can be used to minimize shadowing effects, to improve the uniformity of sensitivity and to better place the corresponding detection zones where they are required.

The primary mirror 121, which is uniquely linked to the secondary mirror 221, is aligned horizontally in operative orientation with at least two primary mirrors 122, 123, 124 that are themselves linked to a common secondary mirror 200. The same holds true for the primary mirror 125, which is uniquely linked to the secondary mirror 225. Similarly, the primary mirrors 121, 122, 123, 124, 125 and secondary mirrors 200, 221, 225 each constitute horizontal rows in operative orientation, in which rows the smaller vertical extension of neighboring mirrors overlaps the larger by more than 50%. The row of primary mirrors contains two mirrors 121, 125 that are linked to, and only to, the mirrors 221, 225 in the row of secondary mirrors. This mix of dedicated mirror pairs with multiple linked mirrors altogether increases performance.

Radiation from the farthest detection zones 11, 12, 13, 14, 15, 16, 17 is first reflected by the largest concave primary mirrors 111, 112, 113, 114, 115, 116, 117 onto the common flat secondary mirror 200 and then onto the sensor elements.

All of the mirror surfaces constitute sections of a circular paraboloid or of a plane. Alternatively, to an extent, linked primary and secondary mirrors could both be shaped as concave reflectors, which also offers extra freedom. However, care must be taken to avoid high aberration due to the non-paraxial nature of the system, mainly at the expense of sensitivity and uniformity of sensitivity.

Figure 5:
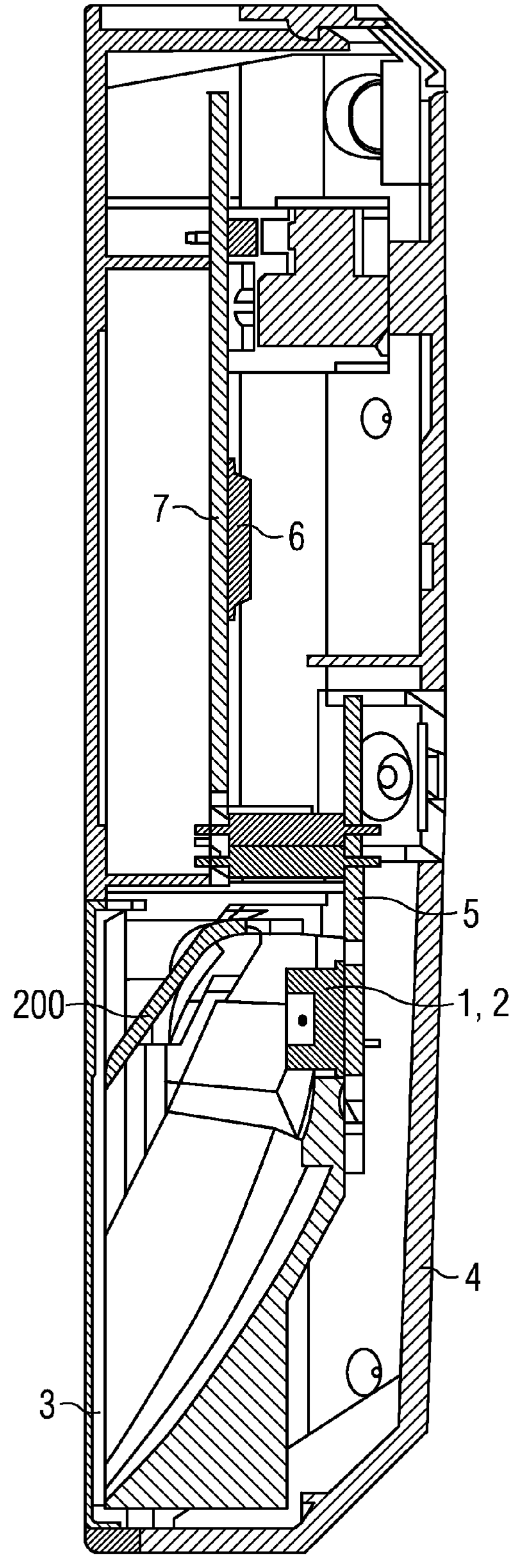
FIG. 5 is a longitudinal-sectional view of the detector.

FIG. 5 shows a housing 4 which contains a window 3 at the front for allowing radiation to enter. The housing is approximately 3 centimeters thick from front to back. Mirror optics, including the secondary mirror 200, are mounted in a lower part of the housing 4. The sensor elements 1, 2 are mounted on a first printed circuit board 5. A unit for processing sensor signals includes a semiconductor microprocessor in the sense of a central processing unit 6 mounted on a second printed circuit board 7. In the alternative, the unit 6 could, for example, be an application specific integrated circuit.

The invention claimed is:

1. A detector, comprising:

a housing with at least one window for allowing radiation to enter;

at least one sensor in said housing for sensing entered radiation;

a unit in said housing for processing sensor signals; and mirrors being shaped and mounted in said housing for reflecting radiation from outside detection zones better than radiation from elsewhere, onto said at least one sensor;

said mirrors including linked mirrors reflecting radiation from a detection zone consecutively and at least two mirrors being themselves linked to a common mirror;

each of said mirrors in said at least one linked pair is shaped and mounted in said housing so as to prevent it from reflecting radiation from their detection zone in sequence with other mirrors onto said at least one sensor;

each of said mirrors in at least one pair of linked mirrors being shaped and mounted in said housing so as to prevent it from reflecting radiation from another detection zone in sequence with other mirrors onto said at least one sensor; and one of said mirrors in said at least one linked pair being concave and the other of said mirrors in said at least one linked pair being substantially flat.

2. The detector according to claim 1, wherein said mirrors in said at least one linked pair include first and second mirrors in sequence from their detection zone, said first mirror being substantially flat and said second mirror being concave.

3. The detector according to claim 1, wherein a mirror in said at least one linked pair is lined up horizontally in operative orientation with at least two mirrors being themselves linked to a common mirror.

4. The detector according to claim 1, wherein a mirror in said at least one linked pair is lined up horizontally in operative orientation with at least three mirrors being themselves linked to one or more common mirrors.

5. The detector according to claim 1, wherein:

said mirrors form horizontal rows in operative orientation, and a smaller vertical extension of neighboring mirrors overlaps a larger vertical extension by more than 50% in said rows; and at least two of said rows each contain two or more mirrors each being linked to one and only one mirror in the other of said rows.

6. The detector according to claim 5, wherein said linked mirrors in one of said rows are substantially flat and said linked mirrors in the other of said rows are concave.

7. The detector according to claim 1, wherein said unit is configured for generating a signal representative of a movement of an object through said detection zones.

8. The detector according to claim 1, wherein said at least one window, said at least one sensor and said mirrors are configured for operating with infrared electromagnetic radiation.

* * * * *